United States Patent [19]

Dobberpuhl et al.

[11] Patent Number: 4,640,378
[45] Date of Patent: Feb. 3, 1987

[54] POWER TAKE-OFF SYSTEM AND ISOLATION MOUNTING THEREFOR

[75] Inventors: Dale R. Dobberpuhl, Horicon; David K. Stricker, Juneau, both of Wis.

[73] Assignee: Deere & Company, Moline, Ill.

[21] Appl. No.: 768,980

[22] Filed: Aug. 22, 1985

[51] Int. Cl.⁴ .............................................. B60K 5/10
[52] U.S. Cl. .................................... 180/53.1; 180/53.7
[58] Field of Search .................... 180/53.1, 53.4, 53.5, 180/53.6, 53.7

[56] References Cited

U.S. PATENT DOCUMENTS

| | | | |
|---|---|---|---|
| 3,570,614 | 3/1971 | Bagno | 180/53.1 |
| 3,951,223 | 4/1976 | Kamlukin | 180/53.1 |

*Primary Examiner*—Richard A. Bertsch

[57] ABSTRACT

A power take-off system and isolation mounting therefor including an isolation member mounted to a vehicle frame bracket. A support brace is fixably mounted to the isolation member. The support brace has mounted thereto a linear displaceable casting aligned to displace in a radial direction relative to the vehicle's engine torque shaft. The casting is biased in a nominal position. One end of a PTO shaft is rotatably supported within the casting. A first pulley is rotatably mounted to the PTO shaft in close proximity to the casting. The other end of the PTO shaft is rotatably mounted to a frame brace to permit limited pivoting of the PTO shaft thereabout. A second pulley and PTO clutch assembly is drivingly supported on the engine torque shaft and load supported by the support brace such that the belt tension loads between the first and second pulleys are isolated from the engine torque shaft.

13 Claims, 5 Drawing Figures

POWER TAKE-OFF SYSTEM AND ISOLATION MOUNTING THEREFOR

BACKGROUND OF THE INVENTION

The present invention relates to power take-off (PTO) mounting arrangements and, more particularly, to PTO systems having isolation mounting.

Front mount (FM) mowers have become increasingly popular within some areas of application because of their superior visibility and maneuverability, and relative stability. An FM mower is conventionally a front wheel drive rear wheel steer vehicle and includes a front hitch or mount for the attachment of implements, such as a mower deck or snow blower. In order to deliver power to an attached implement, it is known to equip the FM mower with a PTO system which selectively communicated with the engine of the FM mower.

Because of the very short length and low ground clearance of an FM mower, many of the conventional PTO systems are ill-suited for application in FM mowers. Further, the use of a diesel and other engines which exhibit a high torque displacement and vibration presents special consideration which impacts on the characteristics of a suitable PTO system. Diesel and similar engines due to the higher torque displacement and vibration require that diesel and similar characteristic engines be isolation-mounted to the mower frame. In contrast, engines which exhibit substantially less torque displacement and vibration, if desired, may be hard-mounted to the mower frame without substantial consequence.

It is further a consideration when employing diesel and similar engines in an FM mower that the PTO system not cause substantial counter loading of the engine crankshaft or crankshaft bearings which could precipitate engine crankshaft misalignment or premature crankshaft bearing failure. In addition, a PTO system, which is driven off the crankshaft through an engine torque shaft, may provide a counter resistance to engine torque deflection, for example, where the PTO system is hard-mounted to the vehicle frame and is driven from the torque shaft through a fixed length median such as a continuous belt. The counter resistance caused by the belt during engine torque displacement imparts a crankshaft torque about the crankshaft bearing which may result in engine misalignment. A still further consideration is that the PTO system not unduly load the torque shaft between the engine and transaxle. In the FM mower, the engine and the transaxle are in relative close proximity with communication therebetween being provided by a torque shaft. Because of this short distance, load responsive deflection or bending of the torque shaft precipitated by the PTO system cannot easily and cost effectively be accommodated by a hard-mounted PTO system.

SUMMARY OF THE INVENTION

It is an object of the present invention to provide a PTO system and mounting arrangement whose vehicle mounting orientation does not compromise vehicle ground clearance.

It is a further objective of the present invention to provide a PTO system and mounting arrangement wherein the mounting of the PTO system accommodates load deflection and vibration of the PTO system precipitated by the vehicle's engine.

It is a still further objective of the present invention to provide a PTO system and mounting arrangement driven by the vehicle engine wherein the mounting arrangement permits driving communication of the PTO system by the vehicle engine without adversely counter-loading the engine crankshaft.

A vehicle such as an FM mower includes an engine mounted to the mower frame communicating with a frame-mounted differential through a torque shaft. The engine's crankshaft or output shaft, torque shaft, and differential input shaft are colinearly aligned. A tubular hub is mounted around the torque shaft in a fixed axial location. Drive pulleys and a PTO clutch assembly are mounted to the hub in a manner to provide selective driving between the drive pulleys and the torque shaft.

The mower frame includes a bracket having a support brace mounted thereto through an isolation member. A linear displaceable casting aligned to displace radially relative to the torque shaft is mounted on the brace. One end of a PTO shaft is rotatably supported within the casting and carries thereon in close proximity to the casting driven pulleys in belt communication with the drive pulleys. The PTO clutch assembly includes a clutch brace which is fixably mounted to the support brace such that the support brace provides belt tension load support.

DESCRIPTION OF THE PREFERRED EMBODIMENT

Figure 1:
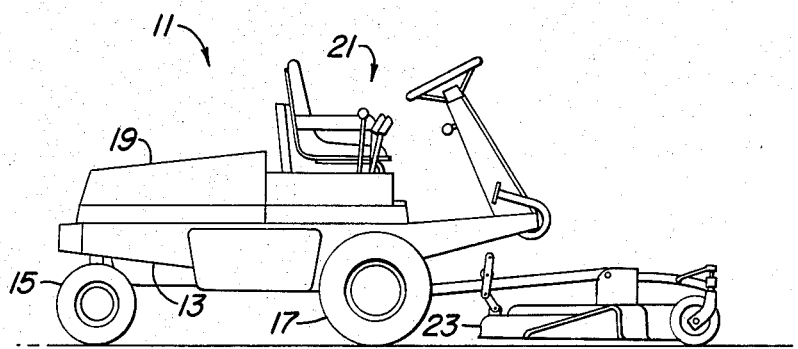
FIG. 1 is a side elevated view of a front mount lawn mower particularly suited for the employment of the present invention.

Referring to FIG. 1, for the purpose of illustrating the invention in the most suitable environment, a front mount (FM) mower, generally indicated as 11, includes a frame 13 supported in a conventional manner on ground-engaging wheels 15 and 17. An engine enclosure 19 is fixably mounted rearwardly on the frame 13 by any conventional means preceded forwardly by a conventional operator station 21. A mower deck 23 is hitched to the front of the FM mower 11 in a conventional manner.

Figure 2:
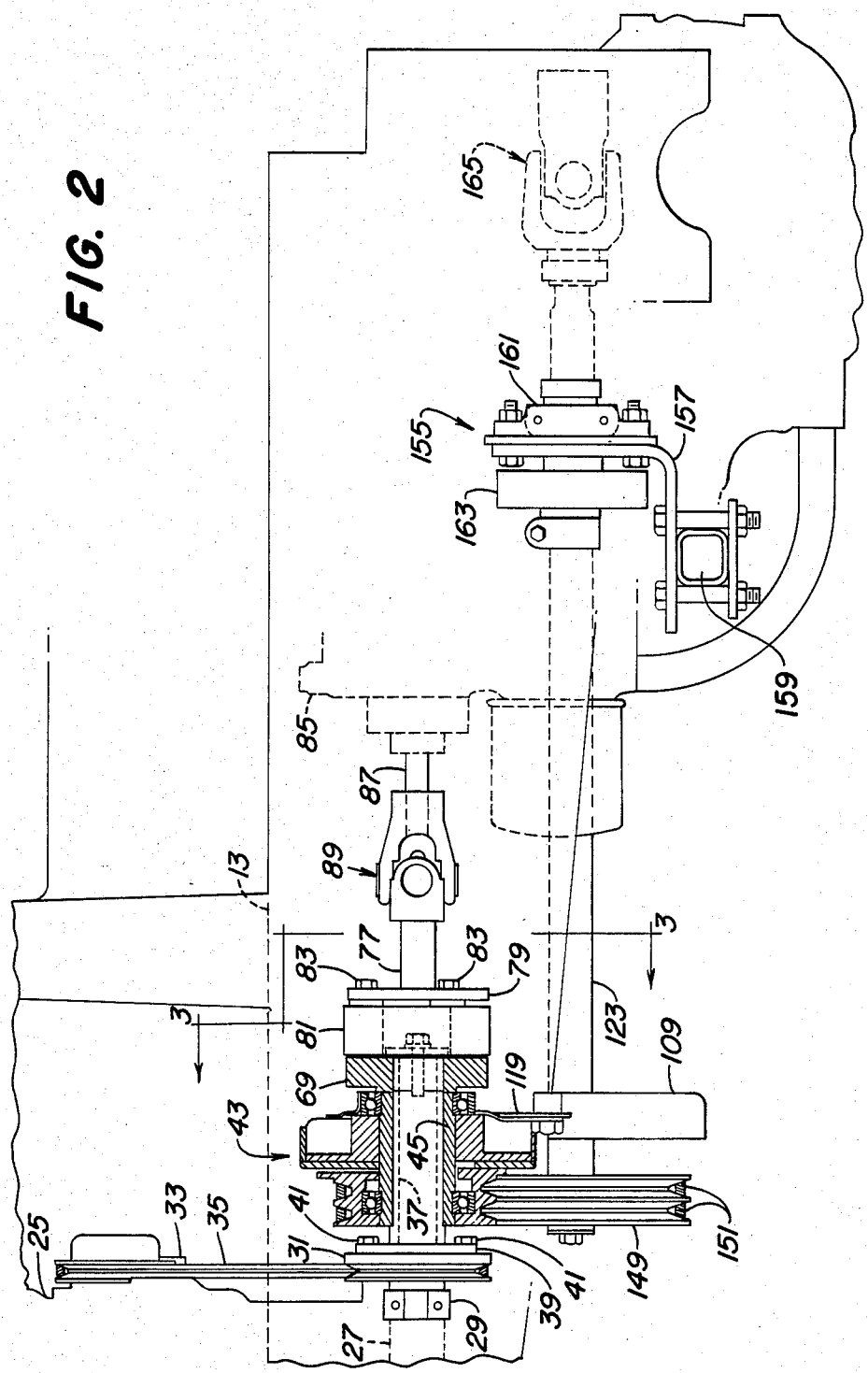
FIG. 2 is a partial side sectioned view of the mower frame, engine and transverse gear axle, and a PTO system and isolation mounting arrangement in accordance with the present invention.

Referring to FIG. 2, a conventional engine 25 is isolation-mounted by any of a variety of conventional means to the frame 13 within the enclosure 19. The engine 25 includes an output shaft 27, epithetically referred to as a crankshaft, rotatably conventionally supported by engine bearings 29. A pulley 31 is conventionally mounted to one end of the output shaft 27. A fan pulley 33 is conventionally rotatably mounted to the engine 25 and is conventionally driven by pulley 31 via a friction belt 35. A torque shaft 37 includes a radial flange 39 formed at the rearward end of the torque shaft 37. The flange 39 is conventionally fixably mounted to the forward face of pulley 31 for example by bolts 41 such that torque shaft 37 is coaxial to output shaft 27.

Figure 5:
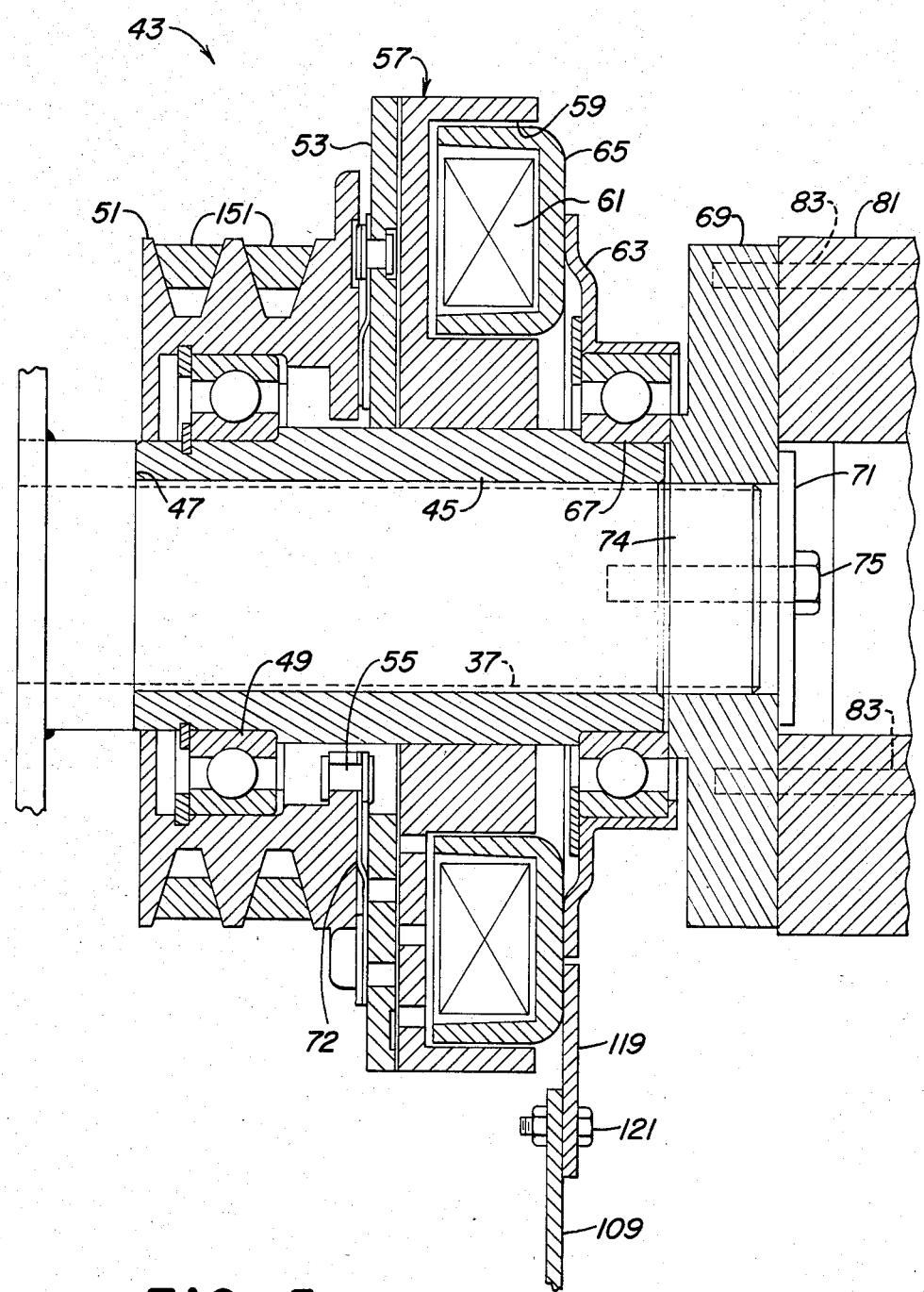
FIG. 5 is a side sectioned view of the drive pulley and PTO clutch.

Referring to FIGS. 2 and 5, located radially around the torque shaft 37 is a power take-off (PTO) pulley and clutch assembly 43. The PTO pulley and clutch assembly 43 is of known design. Model MA-GT-JDZ1 manufactured by Oqura Clutch Co., Ltd., Tokyo, Japan is representative of one satisfactory clutch assembly. The illustrated PTO pulley and clutch assembly consist of a tubular hub 45 is press-mounted radially around the torque shaft 37 to axially abut rearwardly step 47 formed radially around the torque shaft 37. A first bearing 49 fixably mounted around hub 45 rotatably conventionally carries a double pulley 51. An armature plate 53 is formed radially around the forward end of the pulley 51 to allow limited axial motion of pulley 51 along armature pins 55. An armature spring 72 biases the pulley 51 rearwardly on pins 55. A rotor 57 is fixably mounted to the hub 45 and contains a radially continuous channel 59. An electrically responsive coil 61 is received in spaced apart relationship in the channel 59. The coil 61 is supported in channel 59 by a bearing collar 63 which rides on a bearing 67 seated around hub 45. A coupler 69 is press-mounted to the forward end of torque shaft 37. A washer 71 is flange-positioned at the forward end of the coupler 69. A nut 75 extends through the washer 71 to be threadably received is torque shaft plug 74.

Referring particularly to FIG. 2, a final drive shaft 77 having a rearwardly located formed radial flange 79 is conventionally fixably mounted to a spacer 81 and coupler 69 locating the spacer 81 between the coupler 69 and flange 79 by bolts 83 or other equivalents. A conventional variable range transaxle 85 (shown in phantom) is conventionally fixably mounted to the frame 13 and includes an input shaft 87 conventionally coupled to the final drive shaft 77 for example by a universal joint assembly 89. It is herein noted that the engine output shaft 27, torque shaft 37, final drive shaft 77 and differential input shaft 87 are mounted nominally in colinear alignment. The universal joint coupler 89 permits engine torque deflection without resistance from the input shaft 87 of the transaxle 85.

Figure 4:
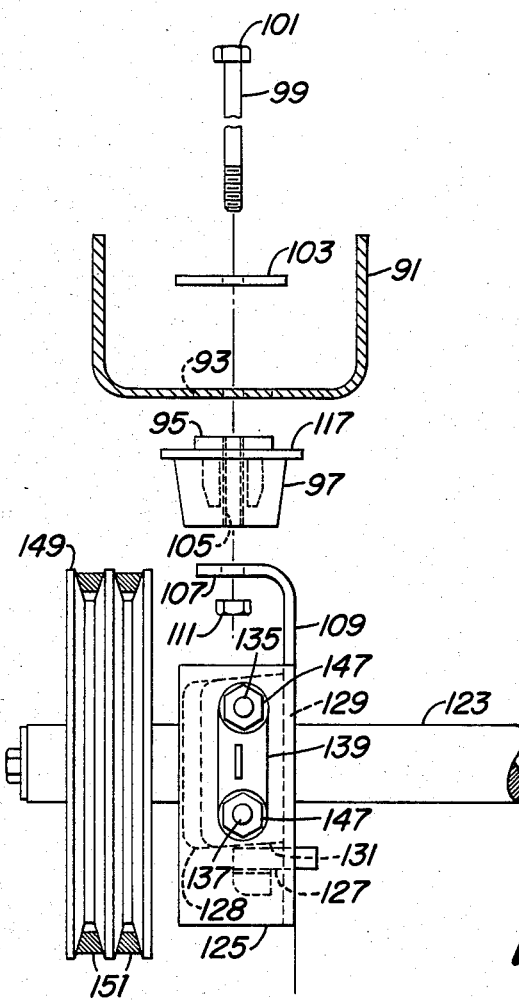
FIG. 4 is a sectioned end view along line 4—4 of the isolation mounting.
Figure 3:
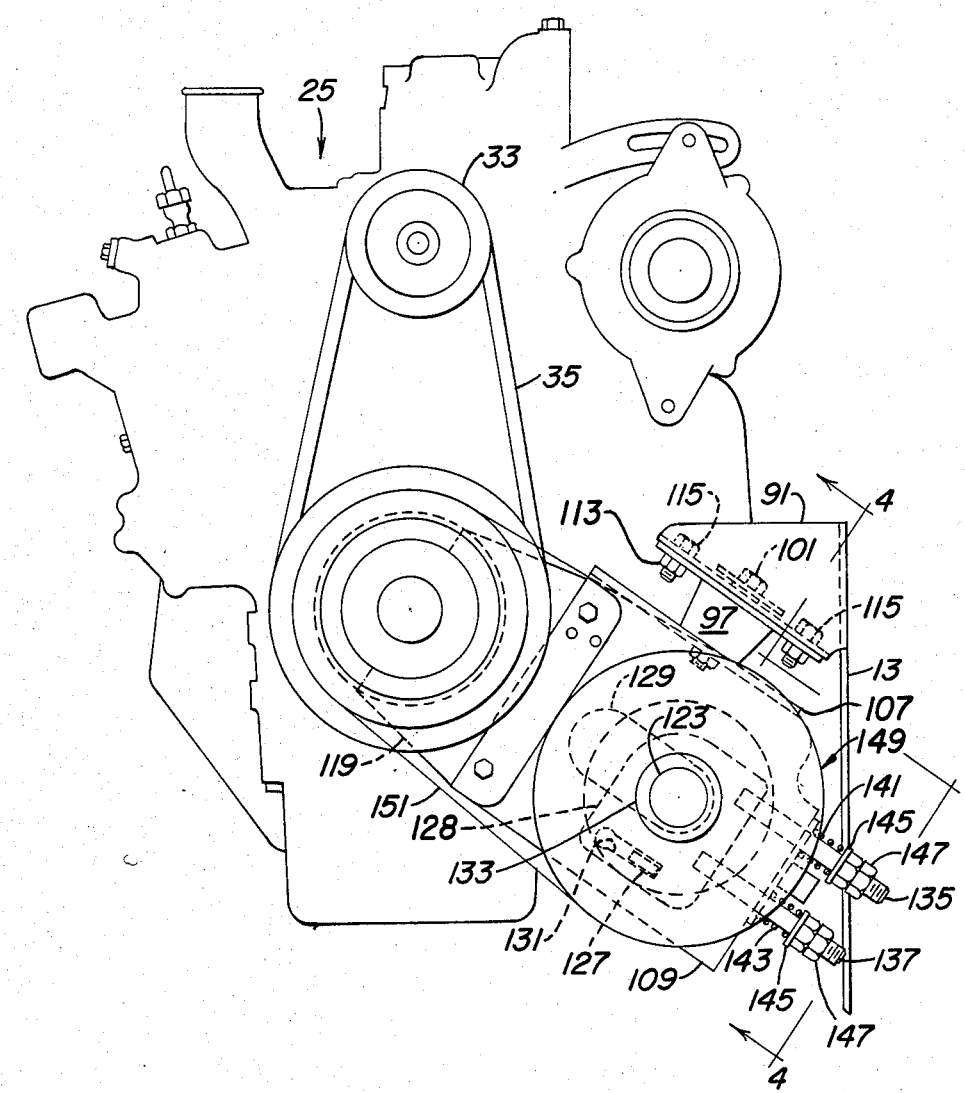
FIG. 3 is an end sectioned view along line 3—3 of the PTO clutch and rearward mounting arrangement.

Referring now to FIGS. 3 and 4, the vehicle frame 13 includes a channeled mounting bracket 91. The mounting bracket 91 includes a hole 93 therein to matingly receive the cylindrical base 95 of an isolation member 97. The isolation member 97 has a generally conical shape having cylindrical base 95 and is preferably composed of an elastomeric material. The stem 99 of a bolt 101 is passed through a washer 103. The washer 103 has an outer radius greater than the radius of base 95 of the isolation member 97. The bolt stem 99 is then journalled through a metallically lined passageway 105 central to the isolation member 97 and flange 107 of a support plate 109. The bolt stem 99 is thereafter threadably received by nut 111. Additionally, nut 113 and bolt 115 secure a mounting plate 117 fused radially around the isolation member 97 to the bracket 91. In order to facilitate maintaining the clutch coil 61 in a stationary location, a brace 119 is fixably mounted to the coil 65 housing (refer also to FIG. 5). The brace 119 is conventionally fixably mounted to a support plate 109 for example, by bolt 121 or an equivanent thereof.

The support plate 109 further provides support for the PTO shaft or jackshaft 123. In order to provide jackshaft support, the support plate 109 further includes a second flange 125, a key 127 and a generally elongated hole or slot 129. A casting 128 is mounted to the support plate 109 having an elongated keyway 131 and a bearing 133 conventionally fixably mounted in the casting 128. The casting 128 is positioned abutting the rearward face of support plate 109 such that key 127 of the support plate 109 resides in keyway 131 of casting 128. A first short threaded rod 135 extends slidably through flange 125 of support plate 109 to be threadably received in casting 128 at one end. A second short threaded rod 137 extends slidably through flange 125 to be threadably received in casting 128 at one end. The short rods 135 and 137 are parallel-aligned. A belt tension indicator 139 is placed abutting to flange 125 such that rods 135 and 137 traverse through a base portion of indicator 139. Springs 141 and 143 are placed around respective rods 135 and 137. A washer 145 and threadably engaged nut set 147 is then positioned around the other end of rod 135 placing spring 141 in compression. In like manner, a washer 145 and nut set 147 is positioned around the other end rod 137 placing spring 143 in compression. Jackshaft 123 extends through the hole 129 and bearing 133 to be rotatably supported by casting 128 at one end. It is noted that keyway 131, elongated hole 129 and key 127 are oriented to permit linear displacement of the jackshaft 133 from a spring biased nominal position in a radial direction relative to torque shaft 37. Located rearwardmost on the jackshaft 123 and conventionally fixably mounted thereto is a double pulley 149 aligned to double pulley 51. A plurality of belts 151 provide driving communication between pulleys 51 and 149.

Referring to FIG. 2, a bearing mount 155 consisting of a bracket 157 conventionally fixably mounted to a frame cross member 159 or other such mounting means. A conventional swivel bearing 161 is conventionally mounted to the bracket 157 such that the forward end portion of jackshaft 123 extends through and is rotatably supported by swivel bearing 161. The jackshaft 123 has fixably mounted therealong a conventional brake drum 163 which interacts with a conventional PTO brake system (not shown). A conventional swivel PTO jack 165 is conventionally fixably mounted to the forwardmost end of the jackshaft 123.

It is here emphasized that the PTO clutch assembly inclusive of pulley 51 is drivenly mounted to the torque shaft 37, however, the PTO clutch assembly is supportably mounted through brace 119 to support plate 109, support plate 109 being mounted to the frame 13 through bracket 91 and isolation member 97. It is therefore recognized that the isolation member 97 provides sufficient deflection characteristics such that limited resistance is provided by PTO clutch mounting arrangement to engine displacement. It is further noted, that casting 128 rotatably supporting the jackshaft 123 is permitted a limited degree of lateral motion radially relative to torque shaft 37. The lateral displacement motion of casting 128 is limited by key 27 of support plate 109 within keyway 131 and spring-rod arrangement (135–141 and 137–143). It is appreciated that the mounting of jackshaft 123 permits the total tension load of belts 151 to be carried by the support 109 thereby eliminating preloading of the engine crankshaft by belts 151. Engine 25 torque deflection resistance acting through crankshaft 27 is thereby limited to that exerted by isolation member 97 which can be calculated to be well within engine tolerance.

While the form of apparatus herein described constitutes a preferred embodiment of this invention, it is to be understood that the invention is not limited to this precise form of apparatus, and that changes may be made thereto without departing from the scope of the invention which is defined in the appended claims.

We claim:

1. A power take-off assembly and isolation mounting arrangement for mounting to the frame of a vehicle having an engine mounted to said frame, said engine having an output shaft in driving communication with the input shaft of a transmission comprising:
   a formed bracket with a hole therein operatively connected to said frame;
   a brace having a generally elongated hole formed therein and a key formed thereon;
   an isolation member mounted to said bracket and said brace such that said bracket radially aligns said hole's elongation of said brace to the axial extension or projection of said output shaft, thereby permitting limited deflection of said brace from a nominal position;
   a casting having a keyway formed therein and a bearing seat having a bearing mounted therein, said keyway being sized to slidably receive said key therein and being oriented to maintain radial alignment of said hole's elongation to said output shaft;
   means for slidably mounting said casting to said brace such that said key is received in said keyway of said casting and such that said casting can slidably displace coextensive relative to said elongation of said hole in said brace from a nominal biased position, whereby said nominal biased position positions said key in first extreme position in said keyway;
   a PTO shaft rotatably supported in said bearing seat at one end and extending through said elongated hole of said brace;
   means, supported by said brace, for providing driving communication between said output shaft of said engine and said PTO shaft; and
   means for rotatably supporting the other end of said PTO shaft such that said PTO can experience limited pivotal motion thereabout.

2. The power take-off system and isolation mounting arrangement of claim 1, wherein said isolation member further comprises:
   a generally conically-shaped elastomeric member having a formed coaxial and generally cylindrical base, a metallic flange fixably mounted around a portion of said elastomeric member in proximity of said base, and a formed axially extending interior passageway;
   said base portion being seated in said hole in said bracket such that said flange of said isolation member abuts a portion of said bracket and said flange fixably mounted thereto; and
   a first flange portion, operatively connected to said brace, fixably mounted to said elastomeric member opposite said base portion of said elastomeric member.

3. The power take-off system and isolation mounting arrangement of claim 1, wherein said mounting means further comprises:
   a second flange portion operatively connected to said brace;
   a stud extending slidably through said second flange portion and being fixably mounted at one end in said casting;
   a spring placed around a portion of said stud; and
   means for locating and adjusting the compression of said spring between said second flange and said locating and adjusting means.

4. The power take-off system and isolation mounting arrangement of claim 1, wherein said communications means further comprises:
   an axially extending key operatively positioned on said engine output shaft;
   a tubular hub having an axially extending keyway and being mounted around said output shaft in fixed axial location and matingly receiving said axially extending key in said keyway;
   a first pulley rotatably mounted around said tubular hub;
   means, mounted in a fixed axial location, for providing selective driving communication between said first pulley and said tubular hub;
   a second pulley fixably mounted at one end to said PTO shaft in close proximity to said casting;
   a continuous drive belt friction-mounted in part around said first and second pulleys; and
   means, fixably mounted to said brace and said communication means, for providing belt tension load support, such that belt tension loads are supported by said bracket through said load support means and said brace.

5. The power take-off system and isolation mounting arrangement of claim 4, wherein said load support means further comprises:
   a clutch brace fixably mounted to said selective driving means and to said brace such that rigid communication is provided between said tubular hub and said clutch brace.

6. A power take-off assembly and isolation mounting arrangement for mounting to the frame of a vehicle having an engine mounted to said frame, said engine having an output shaft in driving communication with the input shaft of a transmission comprising:
   a formed bracket with a hole therein operatively connected to said frame;
   a brace having a generally elongated hole formed therein and a key formed thereon;
   a generally conically-shaped elastomeric member having a formed coaxial and generally cylindrical base, a metallic flange fixably mounted around a portion of said elastomeric member in proximity of said base, and a formed axially extending interior passageway;
   said base portion being seated in said hole in said bracket such that said flange of said isolation member abuts a portion of said bracket and said flange fixably mounted thereto;
   said brace having a first flange portion fixably mounted to said elastomeric member opposite said base portion of said elastomeric member;
   a casting having a keyway and a bearing seat, said keyway being sized to slidably receive said key therein and being oriented to maintain radial alignment of said hole's elongation of said brace to said output shaft;
   first means for slidably mounting said casting to said brace such that said key is received in said keyway of said casting and such that said casting can slidably displace coextensive relative to said elongation of said hole in said brace from a nominal biased position, whereby said nominal biased position positions said key in a first extreme position in said keyway;

a bearing fixably mounted in said bearing seat of said casting;

PTO shaft rotatably supported in said bearing seat at one end and extending through said elongated hole of said brace;

drive means, supported by said brace, for providing driving communication between said output shaft of said engine and said PTO shaft; and second means for rotatably supporting the other end of said PTO shaft such that said PTO can experience limited pivotal motion thereabout.

7. A power take-off system and isolation mounting arrangement as claimed in claim 6, wherein said first means comprises:

said brace having a second flange portion;

a stud extending slidably through said second flange portion of said brace and fixably mounted in said casting at one end;

a spring placed around a portion of said stud; and means adjustably mounted to said stud at the other end locating said spring between said means and said second flange for maintaining said spring in compression.

8. A power take-off system and isolating mounting arrangement as claimed in claim 6, wherein said drive means comprises:

said output shaft of said engine having an output shaft portion extending beyond said engine, said output shaft portion having an axially extending key;

a tubular hub having an axially extending keyway, said tubular hub being mounted around said output shaft portion in fixed axial location and matingly receiving said key of said output shaft portion in said keyway of said tubular hub;

a first pulley rotatably mounted around said tubular hub;

clutching means for providing selective driving communication between said first pulley and said tubular hub, said clutching means being mounted in fixed axial location;

a second pulley fixably mounted at one end to said PTO shaft in close proximity to said casting;

a continuous drive belt friction-mounted in part around said first and second pulleys; and load support means for providing belt tension load support, said load support means being fixably mounted to said brace and to said drive means such that belt tension loads are supported by said bracket through said load support means and said brace.

9. A power take-off system and isolation mounting arrangement as claimed in claim 8, wherein said load support means comprises:

a clutch brace fixably mounted to said clutch means such that rigid communication is provided between said tubular hub and said clutch brace, said clutch brace being also fixably mounted to said brace.

10. A power take-off assembly and isolation mounting arrangement for mounting to the frame of a vehicle, said vehicle having an engine mounted to said frame, said engine having an output shaft in driving communication with the input shaft of a transaxle, comprising:

said frame having a formed bracket with a hole therein;

a brace having a generally rectangular plate configuration, and having a generally elongated hole formed therein and a key formed on said brace, said brace being fixably mounted to said bracket such that said bracket radially aligns to said hole's elongation of said brace to the axial extension or projection of said output shaft;

a casting having a keyway sized to slidably receive said key therein and a bearing seat, said keyway being oriented to maintain radial alignment of said hole's elongation of said brace to said output shaft;

first means for slidably mounting said casting to said brace such that said key is received in said keyway of said casting and such that said casting can slidably displace coextensive relative to said elongation of said hole in said brace from a nominal biased position, whereby said nominal biased position positions said key in a first extreme position in said keyway;

a bearing fixably mounted in said bearing seat of said casting;

a PTO shaft rotatably supported in said bearing at one end and extending through said elongated hole of said brace;

drive means for providing driving communication between said output shaft of said engine and said PTO shaft, said drive means being supported by said brace; and second means for rotatably supporting the other end of said PTO shaft such that said PTO can experience limited pivotal motion thereabout.

11. A power take-off system and isolation mounting arrangement as claimed in claim 10, wherein said first means comprises:

said brace having a second flange portion;

a stud extending slidably through said second flange portion of said brace and fixably mounted in said casting at one end;

a spring placed around a portion of said stud; and means adjustably mounted to said stud at the other end for locating said spring between said means and said second flange and for maintaining said spring in compression.

12. A power take-off system and isolation mounting arrangement as claimed in claim 10, wherein said drive means comprises:

said output shaft of said engine having an output shaft portion extending beyond said engine, said output shaft portion having an axially extending key;

a tubular hub having an axially extending keyway, said tubular hub being mounted around said output shaft portion in a fixed axial location and matingly receiving said key of said output shaft portion in said keyway of said tubular hub;

a first pulley rotatably mounted around said tubular hub;

clutching means for providing selective driving communication between said first pulley and said tubular hub, said clutching means being mounted in a fixed axial location;

a second pulley fixably mounted at one end to said PTO shaft in close proximity to said casting;

a continuous drive belt friction-mounted in part around said first and second pulleys; and load support means for providing belt tension load support, said load support means being fixably mounted to said brace and to said drive means such that belt tension loads are supported by said bracket through said load support means and said brace.

13. A power take-off system and isolation mounting arrangement as claimed in claim 10, 11 or 12 wherein said load support means comprises:

a clutch brace fixably mounted to said clutch means such that rigid communication is provided between said tubular hub and said clutch brace, said clutch brace being also fixably mounted to said brace.

* * * * *

UNITED STATES PATENT AND TRADEMARK OFFICE
CERTIFICATE OF CORRECTION

PATENT NO. : 4,640,378
DATED : 3 February 1987
INVENTOR(S) : Dale R. Dobberpuhl et al It is certified that error appears in the above-identified patent and that said Letters Patent is hereby corrected as shown below:

Column 7, line 23, delete "isolating" and insert therefor -- isolation -- .

Signed and Sealed this

Seventh Day of June, 1988

Attest:

DONALD J. QUIGG

*Attesting Officer*  *Commissioner of Patents and Trademarks*